US012585415B2

(12) United States Patent
Oshiro

(10) Patent No.: US 12,585,415 B2
(45) Date of Patent: Mar. 24, 2026

(54) INFORMATION PROCESSING SYSTEM, INFORMATION PROCESSING METHOD, AND INFORMATION PROCESSING PROGRAM

(71) Applicant: AQUAPLANET CORPORATION, Tokyo (JP)

(72) Inventor: Akira Oshiro, Tokyo (JP)

(73) Assignee: AQUAPLANET CORPORATION, Tokyo (JP)

( * ) Notice: Subject to any disclaimer, the term of this patent is extended or adjusted under 35 U.S.C. 154(b) by 0 days.

(21) Appl. No.: 19/107,287

(22) PCT Filed: Sep. 1, 2022

(86) PCT No.: PCT/JP2022/033045
§ 371 (c)(1),
(2) Date: Feb. 27, 2025

(87) PCT Pub. No.: WO2024/047855
PCT Pub. Date: Mar. 7, 2024

(65) Prior Publication Data
US 2026/0072630 A1 Mar. 12, 2026

(51) Int. Cl.
*G06F 3/14* (2006.01)
(52) U.S. Cl.
CPC ..................................... *G06F 3/14* (2013.01)
(58) Field of Classification Search
None
See application file for complete search history.

(56) References Cited

U.S. PATENT DOCUMENTS 7,587,681 B2 9/2009 Kake et al.
2005/0010599 A1* 1/2005 Kake ....................... G06F 16/48
(Continued)

FOREIGN PATENT DOCUMENTS

JP 2003-223461 A 8/2003
JP 2005-10854 A 1/2005
(Continued)

OTHER PUBLICATIONS

Written Opinion of the International Searching Authority mailed Nov. 22, 2022 for PCT/JP2022/033045.

*Primary Examiner* — Christopher J Kohlman
(74) *Attorney, Agent, or Firm* — Faegre Drinker Biddle & Reath LLP

(57) ABSTRACT

An information processing system has input, comparison, and display units. The comparison unit includes a distance calculation unit comparing comparison objects and a reference object input via the input unit, and calculates distance between the comparison objects and reference object. The reference object is configured from multiple reference elements; the comparison object comprises one or more comparison elements. The display unit includes a multiple-level formation unit forming multiple levels along the Z-axis direction, a level display unit displaying each of the reference elements of the reference object in correspondence with the corresponding level, and a correspondence display unit displaying the comparison elements of the comparison object in the corresponding level among the levels formed in the Z-axis direction. The reference object and the comparison objects are displayed side by side in a substantially rod-like shape extending in the Z-axis direction.

12 Claims, 9 Drawing Sheets

(56)           References Cited

U.S. PATENT DOCUMENTS

2007/0185904 A1     8/2007  Matsuzawa et al.
2016/0299666 A1 *  10/2016  Sakamoto ............ G06F 3/0488

FOREIGN PATENT DOCUMENTS

JP           2005-85166  A      3/2005
JP           4121125  B2      7/2008
JP           2021-086398  A      6/2021
JP           6959659  B2    11/2021

* cited by examiner

Fig. 12

```
        ┌──────┐
        │  SS  │
        └──────┘
            │
            ▼
        ┌──────┐
        │ S10  │◄────────────┐
        └──────┘             │
            │                │
            ▼                │
┌──────┐  ┌──────┐           │
│      │──│ S20  │           │
└──────┘  └──────┘           │
  29        │                │
            ▼                │
        ┌──────┐             │
        │ S31  │             │
        └──────┘             │
            │        ┐       │
            ▼        │       │
        ┌──────┐     │       │
        │ S32  │     ├ S30   │
        └──────┘     │       │
            │        │       │
            ▼        │       │
        ┌──────┐     │       │
        │ S33  │     │       │
        └──────┘     ┘       │
            │                │
            ▼        No       │
          ╱─────╲─────────────┘
         │  S40  │
          ╲─────╱
            │
            │ Yes
            ▼
        ┌──────┐
        │  SE  │
        └──────┘
```

INFORMATION PROCESSING SYSTEM, INFORMATION PROCESSING METHOD, AND INFORMATION PROCESSING PROGRAM

TECHNICAL FIELD

This invention relates to information processing systems, information processing methods, and information processing programs.

BACKGROUND TECHNOLOGY

In information processing systems, there are known techniques for searching for information similar to the desired information.

Patent Literature 1 describes a search system that searches for literatures in response to input information. Also, Patent Literature 2 describes a recording and organizing device and a recording and organizing method which is interactive.

When displaying the retrieved results, conventionally, the similarity of information may be determined respectively and displayed as "proximity". Alternatively, they are also listed by each component, etc., for comparison and reference.

Patent Literature

[Patent Literature 1] Japan Patent Publication raid open No. 2003-223461

[Patent Literature 2] Japan Patent Application No. 2019-214996

SUMMARY OF THE INVENTION

Problem to be Solved by the Invention

When they are displayed as "proximity" based on similarity, it is necessary to refer to each individual information one by one, and furthermore, comparison with the target information must be made individually.

If the information is listed manually, it is easy to compare with the target information, but it is impossible to grasp the information comprehensively based on the similarity.

Therefore, the purpose of the present invention is to provide an information processing system, an information processing method, and an information processing program that enable the comprehensive grasp of information based on similarity and also enables the grasp of individual elements, making it possible to simultaneously grasp the overall and comparison information on a single screen.

The information processing system in one example of the invention incudes an input unit, a comparison unit, and a display unit, the comparison unit having a distance calculation unit configured to compare a comparison object and a reference object, the reference object being configured to be input via the input unit, and calculate a distance between the comparison object and the reference object, the reference object comprising a plurality of reference elements, the comparison object comprising one or more comparison elements, the display unit comprising:

a multiple-level formation unit configured to form a plurality of levels along a Z-axis direction, a level display unit configured to display each of the reference elements of the reference object in correspondence with the corresponding level, and, a correspondence display unit configured to display the comparison elements of the comparison object in the corresponding level among the levels formed in the Z-axis direction, the reference object and the comparison objects are displayed side by side in a substantially bar shape extending in the Z-axis direction.

The information processing system in one example of the present invention is the information processing system described above, characterized in that the levels formed in the Z-axis direction are levels in the order of input in the input unit.

The information processing system in one example of the present invention is the information processing system described above, characterized in that the levels formed in the direction of the Z-axis are levels in the order of outputs in the comparison unit.

The information processing system in one example of the present invention is the information processing system described above, comprising an indication unit, characterized in that the reference element or the comparison element is configured to be displayed when directly indicated by the indication unit or when a predetermined range is indicated by the indicating unit.

The information processing system in one example of the present invention is the information processing system described above, characterized in that the comparison elements are displayed one dimensionally in the X-axis direction in order of similarity to the reference object.

The information processing system in one example of the present invention is the information processing system described above, characterized in that the comparison objects are displayed in two dimensions of the X-axis and Y-axis directions in order of similarity to the reference object.

The information processing system in one example of the present invention is the information processing system described above, comprising a display switching unit, characterized in that the display switching unit is configured to display the Z-axis in addition to the X-axis and Y-axis in the order of similarity to the reference object, in three dimensions.

The information processing system in one example of the present invention is the information processing system described above, characterized in that three-dimensional display is executed using the Z axis, and comprising a display angle adjustment unit configured to change the display angle of the three-dimensional display.

The information processing system in one example of the present invention is the information processing system described above, wherein the comparing unit is equipped with a connection unit connected to outside of the information processing system, the comparing unit being configured to transmit information to be compared to the outside, and receives a result calculated in the outside.

The information processing system in one example of the present invention is the information processing system described above, characterized in that the display unit has no display device and outputs only signals.

The information processing method in one example of the present invention is the information processing method which performs the operation of any one of the information processing system described above, having:

an input step for accepting an input of the reference object from the input portion, a distance calculation step for calculating a distance between the comparison object and the reference object, and a display step, wherein the display step having a multi-level forming step for forming a plurality of the levels in the Z-axis direction, a level display step of displaying the reference elements of each of the reference bodies corresponding to each of the levels, and a corresponding display step of displaying the comparison elements of the comparison bodies in corresponding levels among the levels formed in the Z-axis direction, characterized in that the reference object and the comparison object are displayed side by side in an abbreviated bar shape extending in the Z-axis direction.

The information processing program in one example of the present invention is the information processing program which performs the operation of any one of the information processing system described above, having:

an input step for accepting an input of the reference object from the input portion, a distance calculation step for calculating a distance between the comparison object and the reference object, and a display step, wherein the display step having a multi-level forming step for forming a plurality of the levels in the Z-axis direction, a level display step of displaying the reference elements of each of the reference bodies corresponding to each of the levels, and a corresponding display step of displaying the comparison elements of the comparison bodies in corresponding levels among the levels formed in the Z-axis direction, characterized in that the reference object and the comparison object are displayed side by side in an abbreviated bar shape extending in the Z-axis direction.

Effect of the Invention

The present invention provides an information processing system, an information processing method, and an information processing program that enables the whole and comparison at the same time on a single screen, while grasping the whole based on similarity in addition to grasping individual elements.

BRIEF DESCRIPTION OF THE DRAWINGS

FIG. 12 shows an example of an information processing program in an example of the present invention.

FIG. 13 shows an example of an information processing system in an example of the present invention.

DESCRIPTION OF EMBODIMENTS

Figure 1:
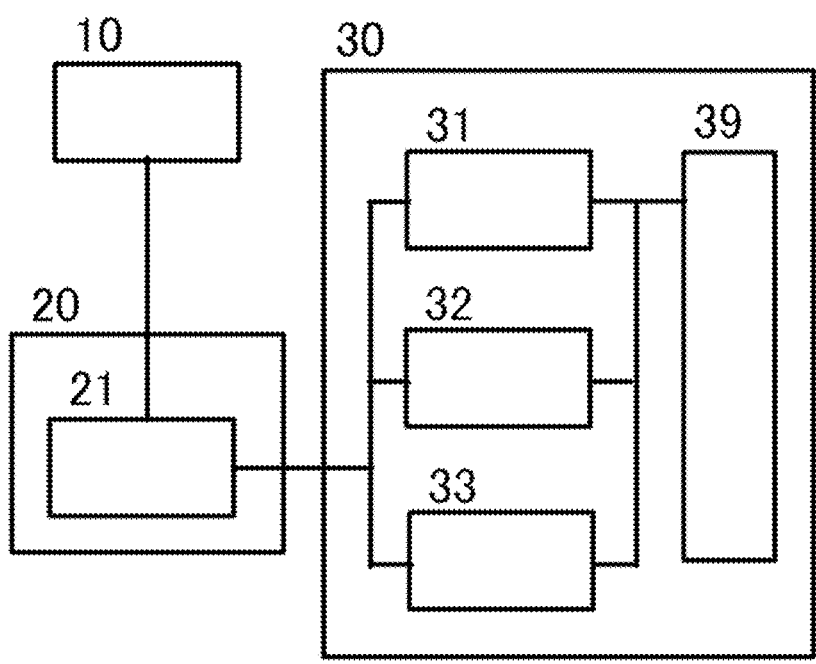
FIG. 1 shows an example of an information processing system in an example of the present invention.
Figure 2:
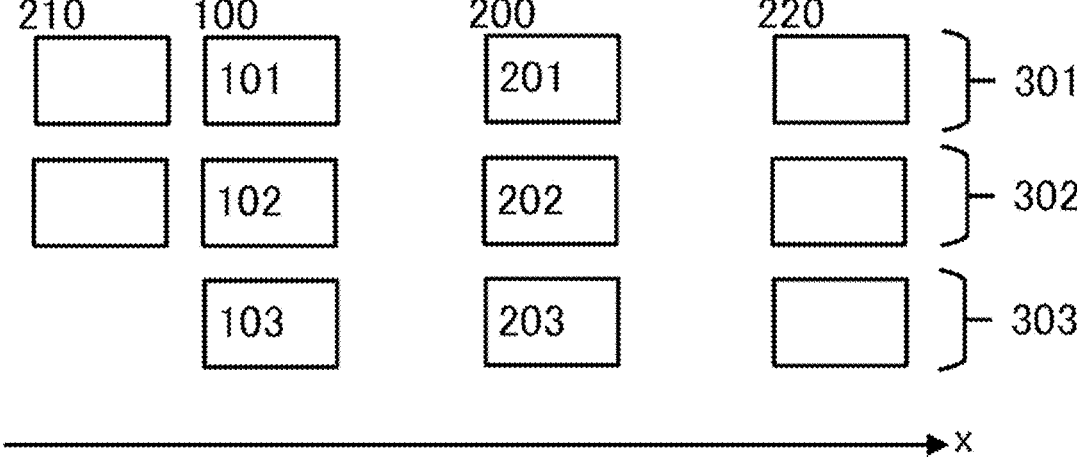
FIG. 2 shows an example of an information processing system in an example of the present invention.

FIGS. 1 and 2 show an information processing system 1 in one example of the present invention.

The information processing system 1 has an input unit 10 and a display unit 30.

The comparison unit 20 has a distance calculation unit 21 that compares a comparison object and a reference object 100 input via the input unit 10 and calculates a distance between the comparison object and the reference object 100. This distance may be in one, two or more dimensions.

This distance is the similarity in this example, and the similarity is calculated in n dimensions, where n is a natural number, and then compressed into one dimension, two dimensions, or other appropriate dimensions. The method of calculating the similarity is based on known methods. For example, the document vector may be dimensionally compressed using t-SNE or other methods, or principal component analysis may be used.

The comparison unit 20 may be provided outside the information processing system 1.

The reference object 100 consists of a plurality of reference elements 101, 102, 103. However, such configuration may also be adopted which can handle the case where there is only one reference element.

The comparison object 200 comprises one or more comparison elements 201, 202, 203. Comparison objects 210 and 220 likewise comprise one or more comparison elements.

The display unit 30 is equipped with a multi-level formation unit 31, a level display unit 32, and a corresponding display unit 33. It is also equipped with a display unit 39.

The multiple level forming unit 31 forms multiple levels in the Z-axis direction.

The level display unit 32 displays the respective reference elements of the reference object 100, corresponding to the respective levels. In other words, reference elements 101, 102, 103 are displayed corresponding to their respective levels.

The corresponding display unit 33 displays the comparison elements of the comparison object in the corresponding level among the levels formed in the Z-axis direction. In other words, the comparison elements 201, 202, 203 are displayed corresponding to their respective levels. As a result, reference element 101 and comparison element 201, reference element 102 and comparison element 202, and reference element 103 and comparison element 203 are displayed in the corresponding levels, respectively.

The reference object 100 and comparison objects are displayed side by side, in an abbreviated bar shape extending in the Z-axis direction. As is clear from the figure, "displayed side by side in a substantially bar shape extending in the Z-axis direction" in the claims and in this explanation does not include the case where they are displayed as a table or a list.

In this example, reference element 101 is a car, reference element 102 is a car body, reference element 103 is aluminum, comparison element 201 is an automobile, comparison element 202 is an auto body, comparison element 203 is steel plate. In other words, level 301 corresponds to a car or an automobile, level 302 corresponds to a car body or an auto body, and level 303 corresponds to material. In addition to the reference object 100 and comparison object 200, comparison objects 210 and 220 are processed in the same way. It goes without saying that the processing of these concepts can be executed with existing software, but other analysis processes may also be used.

With the above configuration, it is possible to grasp the entirety based on similarity while also grasping individual elements, making it possible to simultaneously grasp the entirety and the comparisons on a single screen. In this description, "element" indicates a reference element or a comparison element.

In one example of the invention, the levels formed in the Z-axis direction is the levels of the input order in the input unit 10.

For example, if the input is made in the order of the elements that the input person comes up with, the level will be displayed in the order of the elements that the input person comes up with, and the levels can be aligned with the thoughts of the input person, making it easier for the input person to understand and grasp the levels.

In addition, if the input person determines the order of input according to a predetermined criterion, the levels will be displayed according to the predetermined criterion as well, and the levels will be consistent with the input person's criteria.

In one example of the invention, the levels formed in the Z-axis direction is the levels of output order in comparison unit 20.

For example, if existing software or other software is used in the comparison unit 20, the criteria of the existing software can be utilized as is to form the levels. In this case, the load of computation in the information processing system 1 can also be reduced.

In one example of this invention, as shown in FIG. 2, the comparison objects are displayed in one dimension along the x-axis in order of similarity to the reference object 100.

In this example, a given height (Z) value corresponds to one level. The reference element 101 of the reference object and comparison element 201 of the comparison object are displayed in level 301. Similarly, reference element 102 and comparison element 202 are displayed in level 302, reference element 103 and comparison element 203 in level 303, respectively. The same is true for comparison object 210 and comparison object 220. Since comparison object 210 does not have an element corresponding to level 303, only elements corresponding to levels 301 and 302 are displayed in comparison object 210.

According to this configuration, while checking the results in a row in similarity order, the individual elements can also be grasped, and grasp of the whole and comparisons can be performed simultaneously on a single screen.

Figures 3, 4:
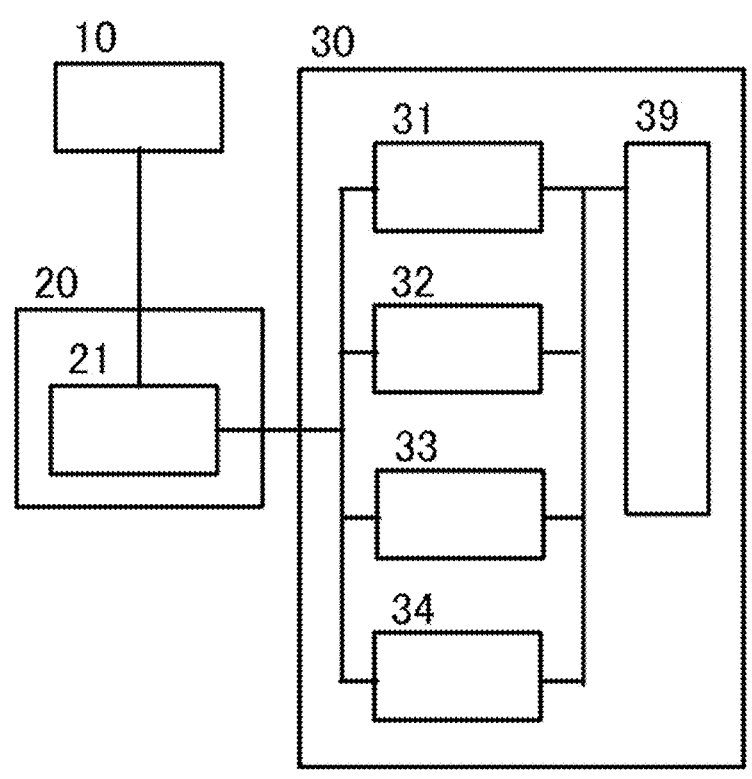
FIG. 3 shows an example of an information processing system in an example of the present invention.
FIG. 4 shows an example of an information processing system in an example of the present invention.

FIGS. 3 and 4 show an example of the configuration of an information processing system 1 in one example of the present invention.

The information processing system 1 is equipped with an indication unit 34.

The reference element or comparison element is displayed when it is directly indicated or when a predetermined range is indicated by the indicating unit 34. For example, the reference element or comparison element is displayed, when a predetermined range, based on the reference element or comparison element, is indicated. In this example, the indication by the indication unit 34 is executed via a cursor indicated by an arrow in the figure.

In one example of the present invention, the contents of the indicated comparison object or reference object 100 may be configured to be displayed when indicated by the indicating unit 34. Also, at least a part of each level may be displayed in a form that differs from the others in color, font, or the like, or an element in the corresponding level may be displayed in a form that differs from the others when indicated by the indicating unit 34.

Figure 13:
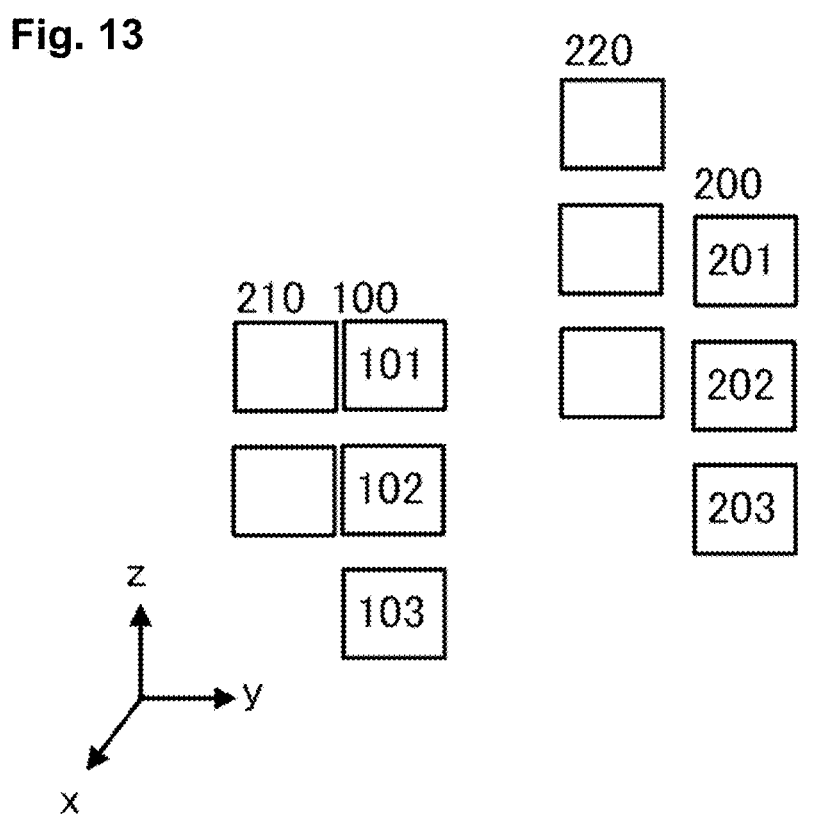

In one example of the invention, as shown in FIG. 13, the comparison objects are displayed in two dimensions in the x-axis and y-axis directions in order of similarity to the reference object 100.

In this example, a given value of Z corresponds to one level 300. In other words, levels 301, 302, and 303 are formed to expand in the XY two-dimensional direction.

According to this configuration, while grasping the entire image on the two-dimensional display based on similarity, the individual elements can also be grasped, and grasp of the entire image and comparison can be made simultaneously on a single screen.

Figure 5:
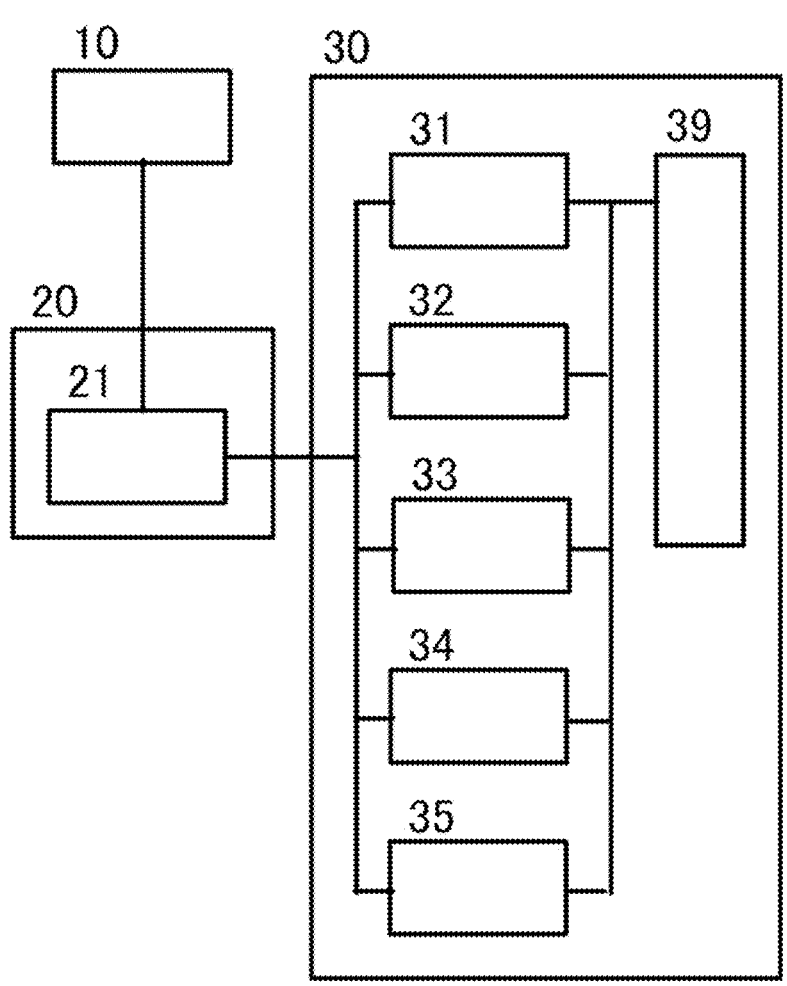
FIG. 5 shows an example of an information processing system in an example of the present invention.
Figure 6:
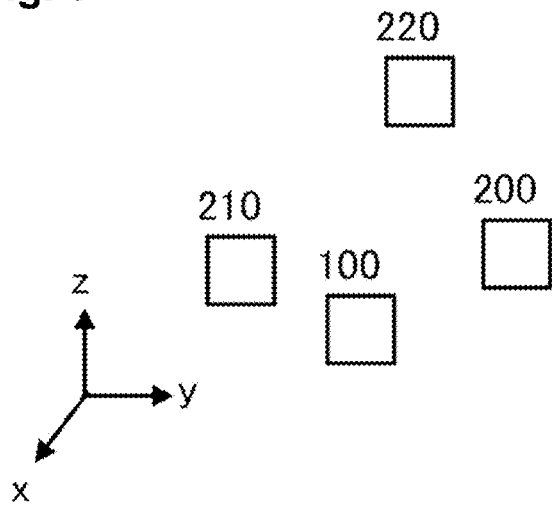
FIG. 6 shows an example of an information processing system in an example of the present invention.

FIGS. 5 and 6 show an example of the configuration of the information processing system 1 in one example of the present invention.

In addition to the X and Y axes, the system is equipped with a display switching unit 35 that enables switching to a 3D similarity display, in which order of similarity to the reference object 100 is displayed three dimensionally in the Z axis in addition to the X and Y axes.

According to this configuration, the 3D similarity display as shown in FIG. 6 can also be utilized when grasping the entire image based on the similarity. In addition, when grasping each element together, the reference element and comparison element are displayed in the Z-axis direction, as illustrated in FIG. 2 and FIG. 4.

Figure 7:
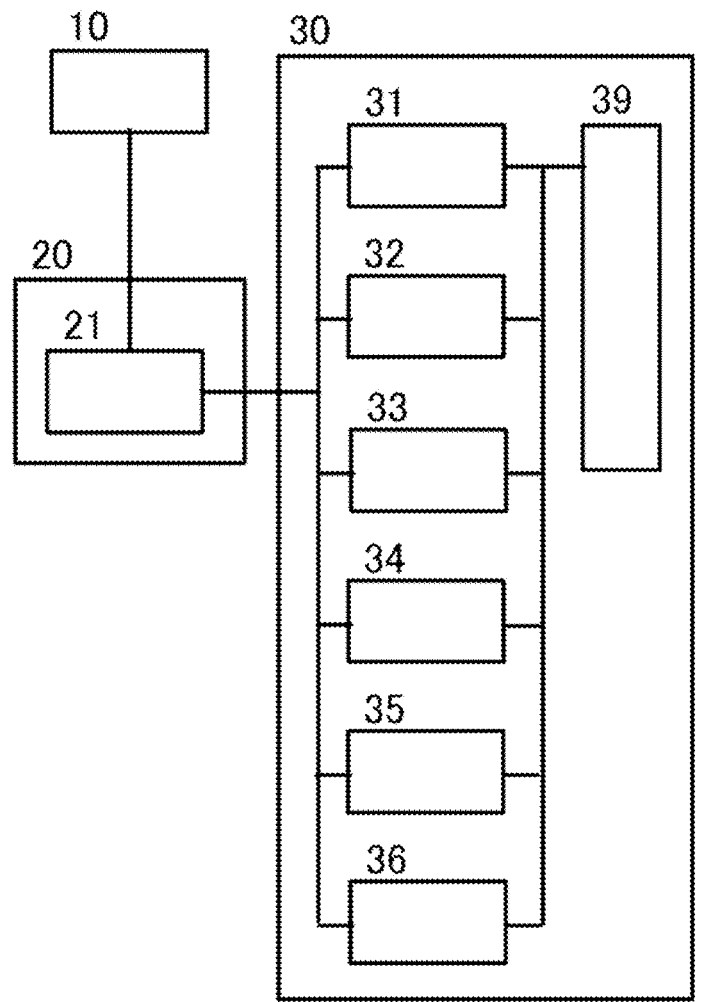
FIG. 7 shows an example of an information processing system in an example of the present invention.
Figure 8:
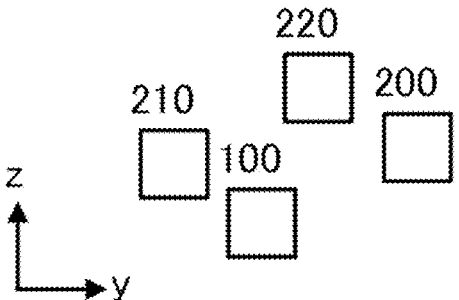
FIG. 8 shows an example of an information processing system in an example of the present invention.

FIGS. 7 and 8 show an example of the configuration of the information processing system 1 in one example.

A three-dimensional display is configured also using the Z-axis, and a display angle adjustment unit 36 is provided to change the display angle of the three-dimensional display so that the display can be adjusted.

Figure 9:
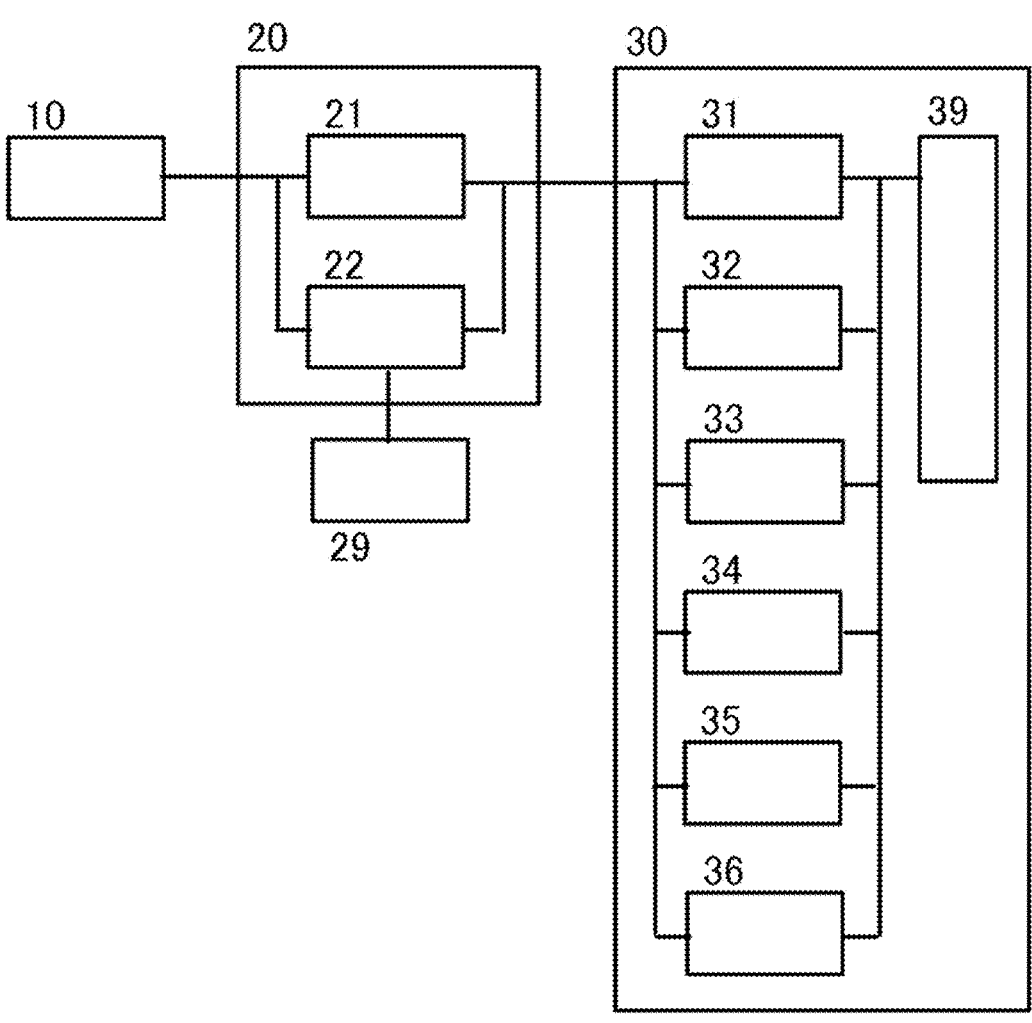
FIG. 9 shows an example of an information processing system in an example of the present invention.

FIG. 9 shows an example of the configuration of an information processing system 1 in one example of the present invention.

The comparison unit 20 is equipped with a connection unit 22 that is connected to the outside of the information processing system 1, transmits information for comparison to the outside, and receives the results calculated in the outside.

Figure 10:
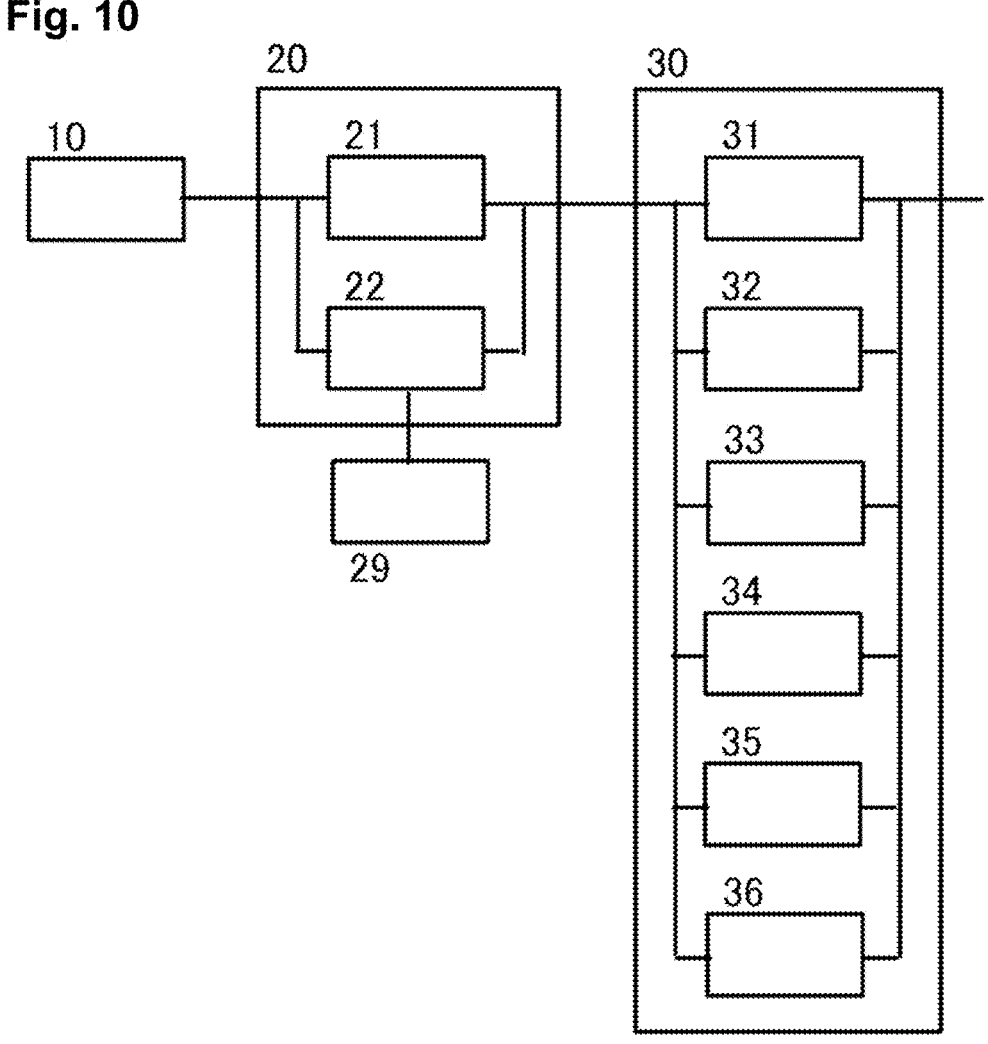
FIG. 10 shows an example of an information processing system in an example of the present invention.

FIG. 10 shows an example configuration of the information processing system 1 in one example.

The display unit 30 does not have a display device 39 and only outputs signals.

Figure 11:
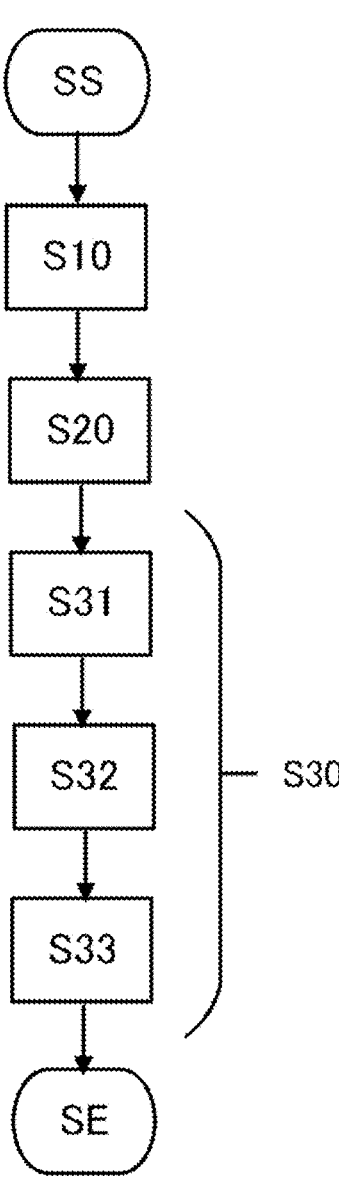
FIG. 11 shows an example of an information processing method in an example of the present invention.

FIG. 11 shows an example configuration of an information processing method in one example of the present invention.

The information processing method executes the operation of any one of the information processing systems 1 described above, and has an input step S10, a distance calculation step S20, and a display step S30.

In the input step S10, input of the reference object 100 is accepted from the input unit 10.

In distance calculation step S20, the distance between the compared object and the reference object 100 is calculated.

The display step S30 has a multiple level formation step S31, a hierarchical display step S32, and a corresponding display step S33.

In the multiple level formation step S31, multiple levels are formed in the Z-axis direction.

In the level display step S32, each reference element of the reference object 100 is displayed corresponding to each level.

In the corresponding display step S33, the comparison elements of the comparison object are displayed in the corresponding level among the levels formed in the Z-axis direction.

The reference object 100 and the comparison object 200 are displayed side by side in an abbreviated bar shape extending in the Z-axis direction.

It goes without saying that each of the above steps may be performed repeatedly, in part or in whole.

Figure 12:
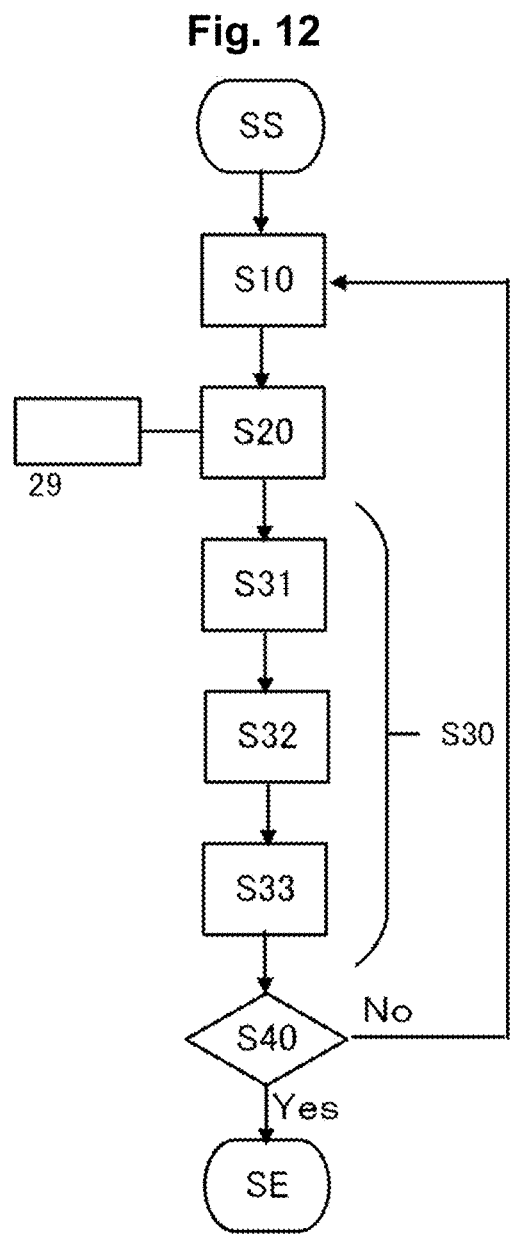

FIG. 12 shows an example of the configuration of an information processing program in one example of the present invention.

The information processing program executes the operation of any one of the information processing systems 1 described above, and has an input step S10, a distance calculation step S20, a display step S30, and an end step S40.

When the information processing program is started (SS), the input step S10 accepts input of the reference object 100 from the input unit 10.

In distance calculation step S20, the distance between the comparison object 200 and the reference object 100 is calculated. Specifically, the data of the reference object 100 is sent to a database in external 29, and comparison objects 200, 210, 220 similar to the reference object 100 are extracted in external 29. During the extraction, each element of the comparison objects 200, 210, and 220 retrieved corresponding to each element 101, 102, and 103 of the reference object 100 is used to form the levels described below.

The display step S30 has a multiple level formation step S31, a level display step S32, and a corresponding display step S33.

In the multiple level formation step S31, multiple levels are formed in the Z-axis direction.

In the hierarchical display step S32, each reference element of the reference object 100 is displayed corresponding to each level.

In the corresponding display step S33, the comparison elements of the comparison object are displayed in the corresponding levels among the levels formed in the Z-axis direction.

The reference object 100 and the comparison object 200 are displayed side by side in an abbreviated bar shape extending in the Z-axis direction.

In the termination step S40, the information processing program is terminated (SE) if there is an input for termination or if there is no next input for a certain period of time.

One example of the present invention is an information processing program storage medium.

The information processing program storage medium contains the information processing program described above, which executes the operation of any of the information processing systems 1 described above.

It goes without saying that the present invention is not limited to the above examples, but includes various examples to the extent that they do not depart from the intent of the invention.

For example, each step may be interchanged in order or multiple steps may be provided to the extent not contrary to the intent of the present application.

For example, the comparison of materials may be implemented with reference element 101 as iron, reference element 102 as specific gravity of iron, reference element 103 as conductivity of iron, reference element 201 as copper, reference element 202 as specific gravity of copper, and reference element 203 as conductivity of copper. Alternatively, it can be useful for inventory management and purchasing, with reference element 101 as iron, reference element 102 as iron price, reference element 103 as iron inventory, reference element 201 as copper, reference element 202 as copper price, and reference element 203 as copper inventory.

For example, an external 29 database may be utilized, or a database that the information processing system has internally beforehand may be utilized. Similarly, the information processing program may be configured to utilize external software for some of the processing.

INDUSTRIAL APPLICABILITY

The purpose of this invention is to provide an information processing system 1, an information processing method, and an information processing program that can simultaneously grasp the whole image and compare individual elements on a single screen, while also grasping the whole image based on similarity.

DESCRIPTION OF CODE

1 Information processing system
10 Input unit
20 Comparison unit
21 Distance Calculation Unit
22 Connection unit
29 Outside
30 Display unit
31 Multi-level formation unit,
32 Level display unit
33 Correspondence display unit
34 Indication unit
35 Display switching unit
36 Display angle adjustment unit
39 Display unit
100 Reference object
101, 102, 103 Reference element
200, 210, 220 Comparison object
201, 202, 203 Comparison element
300, 301, 302, 303 Level

The invention claimed is:
1. An information processing system comprising:
an input unit, a comparison unit, and a display unit,
the comparison unit having a distance calculation unit configured to compare a comparison object and a reference object, the reference object being configured to be input via the input unit, and calculate a distance between the comparison object and the reference object,
the reference object comprising a plurality of reference elements, the comparison object comprising one or more comparison elements, the display unit comprising:

a multiple-level formation unit configured to form a plurality of levels along a Z-axis direction, a level display unit configured to display each of the reference elements of the reference object in correspondence with the corresponding level, and, a correspondence display unit configured to display the comparison elements of the comparison object in the corresponding level among the levels formed in the Z-axis direction, the reference object and the comparison objects are displayed side by side in a substantially bar shape extending in the Z-axis direction.

2. The information processing system according to claim 1, wherein the levels formed in the Z-axis direction are levels in the order of input in the input unit.

3. The information processing system according to claim 1, wherein the levels formed in the direction of the Z-axis are levels in the order of outputs in the comparison unit.

4. The information processing system according to claim 1, comprising an indication unit, wherein the reference element or the comparison element is configured to be displayed when directly indicated by the indication unit or when a predetermined range is indicated by the indicating unit.

5. The information processing system according to claim 1, wherein the comparison elements are displayed one dimensionally in the X-axis direction in order of similarity to the reference object.

6. The information processing system according to claim 1, wherein the comparison objects are displayed in two dimensions of the X-axis and Y-axis directions in order of similarity to the reference object.

7. The information processing system according to claim 6, comprising a display switching unit, wherein the display switching unit is configured to display the Z-axis in addition to the X-axis and Y-axis in the order of similarity to the reference object, in three dimensions.

8. The information processing system as claimed in claim 6, wherein three-dimensional display is executed using the Z axis, and comprising a display angle adjustment unit configured to change the display angle of the three-dimensional display.

9. The information processing system according to claim 1, wherein the comparing unit is equipped with a connection unit connected to outside of the information processing system, the comparing unit being configured to transmit information to be compared to the outside, and receives a result calculated in the outside.

10. The information processing system according to claim 1, wherein the display unit has no display device and outputs only signals.

11. An information processing method which performs the operation of the information processing system according to claim 1, including:

an input step for accepting an input of the reference object from the input portion, a distance calculation step for calculating a distance between the comparison object and the reference object, and a display step, wherein the display step including:

a multi-level forming step for forming a plurality of the levels in the Z-axis direction, a level display step of displaying the reference elements of each of the reference bodies corresponding to each of the levels, and a corresponding display step of displaying the comparison elements of the comparison bodies in corresponding levels among the levels formed in the Z-axis direction, wherein the reference object and the comparison object are displayed side by side in an abbreviated bar shape extending in the Z-axis direction.

12. An information processing program which performs the operation of the information processing system according to claim 1, including:

an input step for accepting an input of the reference object from the input portion, a distance calculation step for calculating a distance between the comparison object and the reference object, and a display step, wherein the display step including:

a multi-level forming step for forming a plurality of the levels in the Z-axis direction, a level display step of displaying the reference elements of each of the reference bodies corresponding to each of the levels, and a corresponding display step of displaying the comparison elements of the comparison bodies in corresponding levels among the levels formed in the Z-axis direction, wherein the reference object and the comparison object are displayed side by side in an abbreviated bar shape extending in the Z-axis direction.

* * * * *